March 30, 1943.  H. F. ELLIOTT  2,315,191

ELECTRICAL CONTROL APPARATUS

Filed May 20, 1940  8 Sheets-Sheet 1

INVENTOR.
HAROLD F. ELLIOTT
BY Forman L. Mueller
ATTORNEY.

March 30, 1943.   H. F. ELLIOTT   2,315,191
ELECTRICAL CONTROL APPARATUS
Filed May 20, 1940   8 Sheets-Sheet 2

INVENTOR
HAROLD F. ELLIOTT
By Roorman L. Mueller
ATTORNEY

INVENTOR.
HAROLD F. ELLIOTT
BY
ATTORNEY.

March 30, 1943.  H. F. ELLIOTT  2,315,191
ELECTRICAL CONTROL APPARATUS
Filed May 20, 1940  8 Sheets-Sheet 5

INVENTOR.
HAROLD F. ELLIOTT
BY
Norman L. Mueller
ATTORNEY.

March 30, 1943.  H. F. ELLIOTT  2,315,191
ELECTRICAL CONTROL APPARATUS
Filed May 20, 1940  8 Sheets-Sheet 6

Fig. 11

INVENTOR.
HAROLD F. ELLIOTT
BY Foorman L. Mueller
ATTORNEY.

March 30, 1943.   H. F. ELLIOTT   2,315,191
ELECTRICAL CONTROL APPARATUS
Filed May 20, 1940   8 Sheets-Sheet 7

INVENTOR.
HAROLD F. ELLIOTT
BY
ATTORNEY.

March 30, 1943.          H. F. ELLIOTT                2,315,191
                    ELECTRICAL CONTROL APPARATUS
                   Filed May 20, 1940        8 Sheets-Sheet 8

INVENTOR.
HAROLD F. ELLIOTT
BY Fairman L. Mueller
ATTORNEY.

Patented Mar. 30, 1943

2,315,191

UNITED STATES PATENT OFFICE 2,315,191

ELECTRICAL CONTROL APPARATUS

Harold F. Elliott, Chicago, Ill.

Application May 20, 1940, Serial No. 336,083

24 Claims. (Cl. 175—320)

This invention relates to control apparatus and in particular to an automatic tuning device for radio receiving apparatus. This application is a continuation in part of application Serial No. 82,494, filed May 29, 1936, and issued on May 21, 1940, as Patent No. 2,201,162.

It is an object of this invention to provide an improved automatic tuning device for radio receiving apparatus.

A further object of this invention is to provide simple, inexpensive, rapid, and accurate means for tuning radio sets by electrical control from local push buttons, remote push buttons, time control clocks and other circuit initiating means, when such means are connected either separately or in parallel.

A still further object of this invention is to provide a tuning device which may be used with equal efficiency in a tuning system with substantially any type of mechanism for changing frequencies, although it is particularly adaptable to a trimmer condenser tuning device.

Another object of this invention is to provide an automatic tuning device which is of simple, compact and rugged construction and comprised of parts which are readily standardized and formed by punching or stamping operations to reduce manufacturing costs to a minimum.

A feature of this invention is found in the provision of a relay for tuning radio sets in which the mechanical arrangement of the magnets, armatures, switches and interlocks provides for their operation by relatively small magnetic forces, whereby to provide for the efficient application of small, low cost magnets.

A further feature of this invention is found in the provision of a power relay which is operatively associated with each of a plurality of control stations to provide for an automatic operation of the radio receiving set whenever a station button is pressed and to stop such operation on the pressing of an "off" button.

A still further feature of this invention is the provision of an automatic tuning device having an armature for operating the switch contacts of a particular circuit, in which as many switches as desired may be operated by each armature, the switches being constructed integrally with trimmers or connected to other tuning means so as to permit great flexibility in the use of tuning circuits and types of tuning means.

Another feature is found in the provision of automatic tuning apparatus in which a single latch is arranged to effect a selective releasable locking of the tuning circuits and the power relay, with a single release relay being operable to actuate the latch to open such tuning circuits and power relay.

Yet another feature of this invention is the provision of similar magnetic parts for the tuning switches and power and release relays to provide for their standardization and consequent commercial production at low cost.

Further objects, features and advantages of this invention will appear from the following description when taken in connection with the accompanying drawings, in which.

The present invention provides a relay structure in which a tuning magnet, an armature and one or more pairs of contacts operated from the armature by an insulating member are included with each control station. An interlock, or latch, operated by the tuning magnets, or by a separate magnet in series in the common return circuit of the tuning magnets, provides for holding the tuning magnet last operated in closed position and for releasing previously operated tuning magnets. The interlock also holds a power switch or relay closed whenever a tuning magnet is energized and opens the switch when the "off" circuit is energized. The power switch may be operated by a magnet in the common return circuit of the tuning magnets or by a separate circuit controlled by switches operated with the tuning switches.

With reference to Figs. 1 to 4, the preferred form of the invention includes an L-shaped supporting frame 20 for a plurality of magnets 21a–21f, inclusive, which are in longitudinal alignment and operatively associated with corresponding longitudinally aligned armatures 22a–22f, inclusive, respectively. The vertical extending leg portion 23 of the combination yoke and supporting member 20 is of a length substantially equal to the length of the magnets, for a purpose to be explained. Although the tuner is shown as comprised of a power relay 24, a trip or release relay 26, and four control stations or switches 27a, 27b, 27c, and 27d, it is to be understood, that any desired number of control stations may be used. Since each magnet and armature is of substantially the same construction, only one corresponding set thereof such as 21a and 22a of control switch 27a will now be described.

The armature 22a (Fig. 3) is provided near its end 28a with an elongated aperture or slot 29a which is adapted to receive therethrough one of a plurality of corresponding extending fingers or projections 31 which are integrally formed with a longitudinally extending mounting plate 32 having a bent side portion 33; the portion 33 and the bent end portion 34 of each finger 31 providing for a mounting plate of substantially U-shape. The fingers 31 are substantially co-extensive in length with the leg portion 23 of the supporting frame or yoke 20 and are attached to such leg portion by screws 37 or like means. It is thus seen that the armature 22a is pivotally supported on a finger 31 in a manner to be movable into and out of contacting engagement with its associated magnet 21a. Because of the mechanical assembly of the magnets, the pole pieces therefor, and the yoke or supporting frame for the magnets, the upper face of the leg portion 23, and the pole face may all be simultaneously ground after assembly so that these faces are in absolute alignment and a full face contact with the armature at all these points is assured. This contributes to quiet operation on alternating current. The action of the magnet to attract the armature is opposed by the action of a spring 38a, which is secured at one end to the armature end 28a and at its opposite end to the bent end portion 34 of a corresponding finger 31 and is adapted to normally exert a pressure in a direction to maintain the armature 22a out of engagement with the magnet 21a.

The armature 22a, after de-energization of the magnet 21a, is locked in substantially its engaging position with the magnet by a non-magnetic latching plate or interlocking member 39 which is pivotally connected to the supporting frame 20 by T-shaped holding members 41 extending through slots in the plate 39 and secured to the free end of the frame leg member 42 as by screws 45 or like means. The latching plate 39 is provided in a suitable stamping metal and is formed at its free side with a holding lip 43 which is adapted for sliding engagement over a portion of its length with the armature end 44a to effect a gradual lifting of the plate 39 against the action of the springs 46 prior to the snap engagement of the lip 43 with the armature. Each of the springs 46 is arranged in tension between the latch 39 and a transversely extending bracket 47 which is attached to the opposite ends of the supporting frame 20. Suitably mounted in the corresponding ends 48 of the brackets is a non-magnetic bar 49, the bar acting as a stop for the armature 21a to define one of its two operating positions.

The armature 22f associated with the power relay 24 and the armatures of the control switches 27a–27d are of substantially flat form over their entire length so as to be held by the lip 43 when they are in a contacting position with their respective magnets. Since the tuning switches 27a–27d are separately operated the movement of an actuated armature into an engaging position with its energized magnet will move the latch plate 39 outwardly, prior to contacting the magnet, to release any previously actuated armatures. This is shown clearly in Figs. 3 and 4 with the holding lip 43 acting as a cam as an armature is pulled from full line position to dotted line position. An energization of one of the magnets 21a–21d, therefore, not only actuates an armature to effect a closing of its corresponding tuning circuit, but also actuates such armature to pivot the latch member 39 out of its engaging position with any previously actuated armature to open any previously closed tuning circuit.

In one commercial application of this embodiment trimmer condensers, 51a–51d are provided for each of the tuning switches 27a–27d, respectively, the condensers being suitably arranged in longitudinal alignment on a supporting rack 52 which is secured to the bent portion 33 of the mounting plate 32 so that a condenser is located substantially opposite a corresponding switch armature. The condensers 51a–51d are adjusted in a well known manner, by adjusting screws 53a–53d, respectively, and are suitably insulated from the plate 32 and rack 52. Each condenser 51a–51d is comprised of two related portions 50a–50d, respectively, which are mounted on parallel longitudinally extending plates 54 and 54', with each portion being provided with spring contacts 56a–56d, respectively, projecting transversely, from the plates 54 and 54'. The contacts 56a–56d on each plate 54 and 54' are normally biased in a direction to engage longitudinal conductors or busses 57 and 57', respectively, which are insulatingly mounted in a spaced relation on on the plates 54 and 54'. Although only two condenser portions are shown for each switch 27a–27d, it is to be understood that any number may be employed depending upon the particular control circuits in the tuning system; additional portions being readily provided for by the assembly of additional plates 54 and conductors 57. The end of each spring contact 56a–56d (Figs. 1 and 2) is of substantially T-shape to provide for their dove tail engagement, in a well known manner, in corresponding T-shaped apertures 55a–55d formed in flat insulating members 58a–58d, respectively, an insulator being provided for each tuning switch 27a–27d, and being adapted to effect a concurrent operation of corresponding spring contacts. Each insulator 58a–58d is maintained in following engagement with its respective armature 22a–22d, by the normal tension of the contacts 56a–56d, movement of an armature by its corresponding magnet providing for a movement of the associated contacts into contacting engagement with the conductors 57 and 57'.

Figure 4:
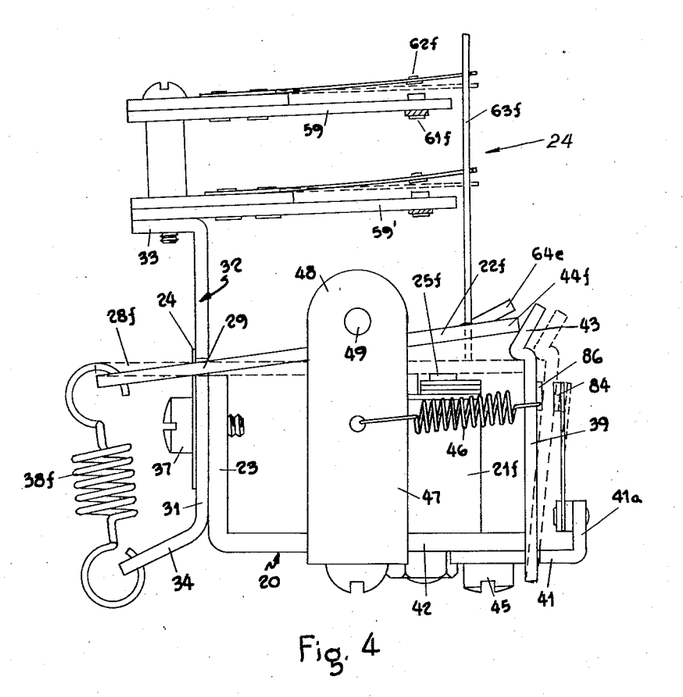
Fig. 4 is an enlarged end elevation looking toward the right in Fig. 2.

The power relay 24, as is best seen in Fig. 4, includes spaced insulating members 59 and 59' which are separate from but in alignment with the plates 54 and 54' previously described; the members 59 and 59' being attached to the bent portion 33 of the mounting plate 32. Each member 59 and 59' is provided with a pair of stationary contacts 61f and corresponding spring contacts 62f being normally tensioned for engagement with the contacts 61f. The contacts 62f are in dove tail engagement with a flat insulating member 63f which provides for a concurrent operation of all of the contacts 62f and is adapted for actuation by movement of the armature 22f; the contacts 62f maintaining the insulator 63f in following engagement with the armature 22f in a manner similar to that previously described in connection with the insulators 58a–58d for the tuning switches 27a–27d.

The closed positions of the armatures for the tuning switches 27a–27d and power relay 24, as maintained by the latch plate 39, occurs after contact has been effected between the contacts 56a–56d and conductors 57 and 57', and contacts 62f and 61f, respectively. The insulators 58a–58d and 63f are thus floatingly supported between their corresponding armatures and spring contacts, so that all of the tension in the contacts 56a–58d and 62f is utilized in effecting an efficient contact engagement with conductors 57 and 57', and contacts 63f, respectively, and is not lost in urging the insulators against their corresponding armatures.

Figure 1:
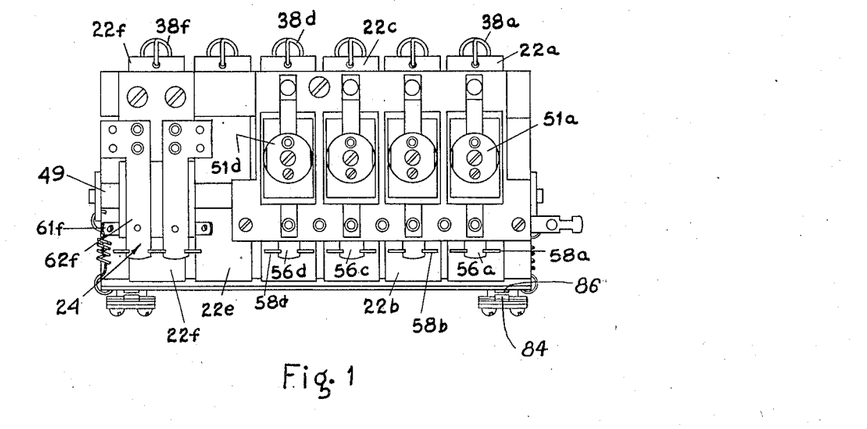
Fig. 1 is a plan view of a preferred embodiment of the invention.
Figure 2:
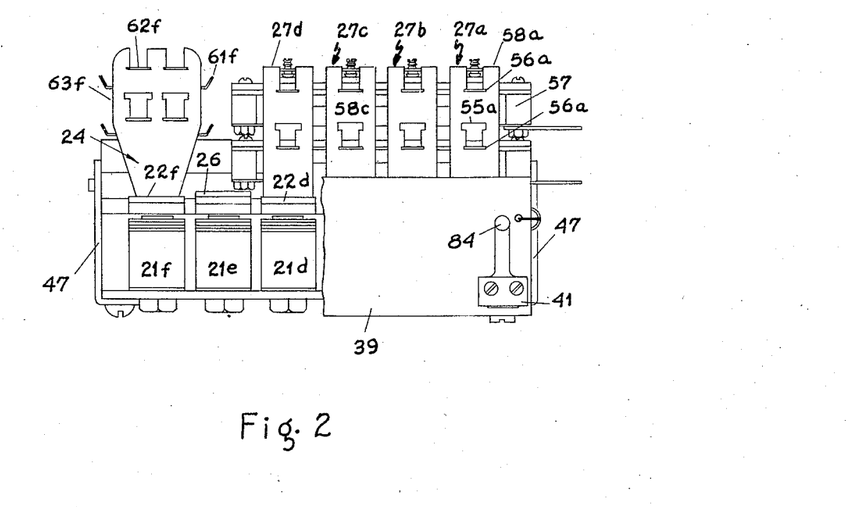
Fig. 2 is a front elevational view of the same.
Figures 3, 3A:
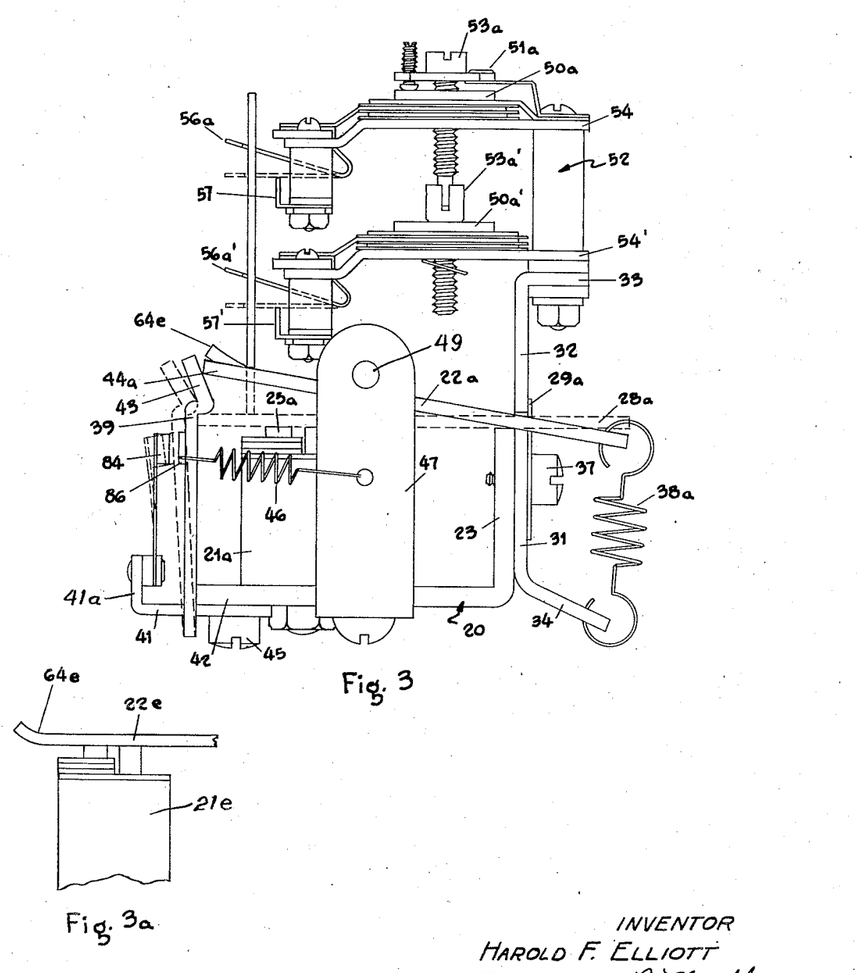
Fig. 3 is an enlarged end elevation looking toward the left in Fig. 2.
Fig. 3a is a detail fragmentary view of the latch and associated armature of the trip relay.

In the practice of this invention it is contemplated that the power relay 24 be operated concurrently with each of the four control switches 27a–27d. Operation of one of the control switches, such as 27a, effects an energization of both the magnets 21a and 21f so that their respective armatures 22a and 22f are moved into an engaging position with the lip portion 43 of the interlock member 39. On operation of a second control switch, such as 27b, the lifting of the latch plate 39 by the armature 27b effects a disengagement of the armatures 22a and 22f to provide for a closing only of the control circuit controlled by the switch 27b and the power relay 24. Since the power relay 24 is energized concurrently with each of the magnets for the tuning switches 27a–27d raising of the interlock 39 by movement of the armature 27b does not effect any opening of the power relay, the armature 22f remaining in a contact position with the magnet 21f during the lifting of the latch 39. The armature 22e for the trip or release relay 26, as shown in Figs. 3a and 4, is formed with a bent end portion 64e so that upon its actuation by the magnet 21e, the bent portion 64e acts to pivot the latch 39 sufficiently to release all previously closed contacts without itself effecting any latching or holding engagement with the latch 39. The armature 22e thus provides only for a complete releasing or tripping of all previously closed contacts.

The armatures for the tuning switches 27a–27d and for the power relay 24 are balanced in their open position by the opposed action of the spring contacts 56a–56d and 62f, respectively, and the springs 38a–38d and 38f, respectively, so that a relatively small magnetic force is required to operate the armatures. This is important, because in the open position of the armatures the gap between the armature and pole pieces is the maximum, and the magnetic force on the armature is correspondingly small. By virtue of the pivotal support of each armature on a corresponding finger 31 but small frictional losses are encountered in the mechanical movement of the armature so that with the spring forces at this position supplying the minimum resistance to movement of the armature, a very efficient application of a small magnetic force can be obtained. Furthermore, the mounting position of the spring contacts in the switches is such that there is not only the initial helpful tension, but in closed position the contacts are still under pressure and provide a good electrical contact without the application of a large pulling force by the armature as is often necessary in the prior relay and switch devices. This spring balancing of the armatures, when in their opened positions, and the consequently small magnetic force necessary to operate the armatures, makes it possible to use relatively small magnets. Since most A. C. magnets are big clumsy devices the utilization of a small A. C. magnet effects an appreciable reduction in the cost of the tuner as compared to prior devices. The magnets are adapted for either A. C. or D. C. application, in the usual manner, by a shading of the pole pieces 25a–25f. Since the magnets for the power and release relays and for all of the tuning switches are the same the magnets used in the tuner may be completely standardized to effect a further reduction in the commercial cost of the tuner.

Figure 17:
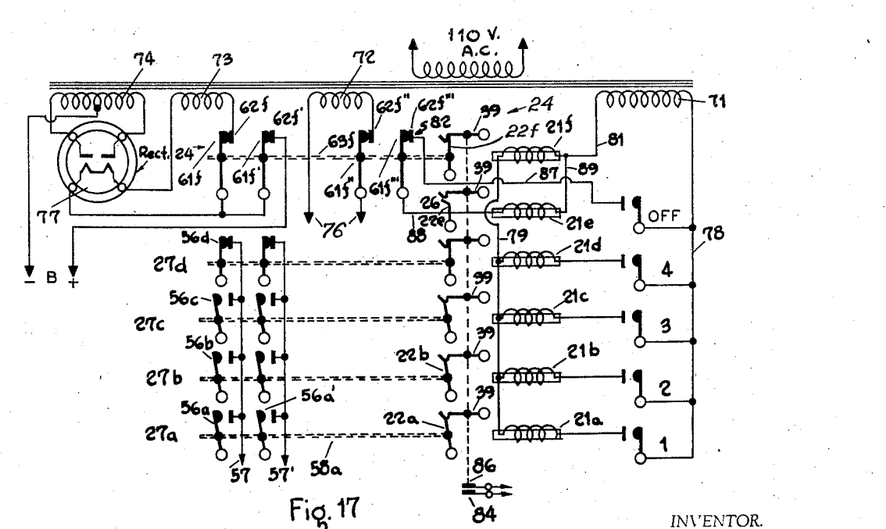
Fig. 17 is a diagrammatic illustration showing the electrical circuit for the embodiment of Fig. 1 and its associated switches.

The operation of the above described tuning device is best understood from the circuit diagram shown in Fig. 17 in which the tuning switches 27a to 27d, inclusive, are indicated in controlled association with push buttons 1 to 4, inclusive, respectively. Power for the control circuits is illustrated as being obtained from a suitable A. C. supply, which is inductively connected to the circuits through suitable transformers, the power transformer 71 supplying energizing current to the magnets 21a-21f, and the transformers 72, 73 and 74 supplying energy to the radio heater circuit 76, and to the filament and plates of the rectifier 77, respectively. On actuation of the push button 1 for the tuning switch 27a the circuit for the magnets 21a and 21f is momentarily closed, the current from the transformer 71 flowing through conductor 78, push button 1, coil 21a, conductor 79 and coil 21f, back to the transformer through conductor 81. Energization of coils 21a and 21f actuates armatures 22a and 22f into latching positions with the latch 39 so that upon release of the push button 1, and consequent de-energization of the coils 21a and 21f, the armatures 22a and 22f are retained in a closed position with their respective coils. Actuation of the armature 22a provides for a movement of the insulator member or Bakelite bar 58a to permit contact of the spring contacts 56a with the conductors or busses 57 and 57', which are in electrical circuit with the tuning circuits of the radio receiving set (not shown). The actuation of the armature 22f for the power relay 24 permits a movement of the Bakelite bar 63f to provide for an engagement of the contacts 61f and 62f whereby to close the heater and rectifier circuits of the radio receiver, and also to provide for a closing of an interlocking switch 82, the switch 82 forming a part of the circuit for the release relay 26. The radio set is thus conditioned for the tuning in of the particular station identified by the push button 1, which station will be heard so long as the armature 22a is retained in its closed position.

It is now desired to tune in the station identified by push button 4, it being understood that a similar operation would also be effected by actuation of the push button 2 or 3. On closing of push button 4 the circuit for the tuning switch 27d is momentarily closed from the transformer 71 through conductor 78, push button 4, coil 21d, conductor 79, coil 21f, and back to the transformer 71 through conductor 81. Movement of the armature 22d to its latched or closed position effects a lifting of the interlock 39 to provide for a release of the armature 22a therefrom, the armature 22f being retained in its closed position by virtue of the energization of coil 21f, whereby the contacts 62f of the power relay 24 are all maintained in a closed position. The release of armature 22a provides for a disengagement of the contacts 56a from the conductors 57 and 57' while movement of the armature 22d into a closed position provides for an engagement of the contacts 56d, with the conductors 57 and 57'. The tuner is thus conditioned to provide for reception from the station identified by the push button 4, as shown in Fig. 17.

During the tuning operation a momentary muting of undesirable signals is obtained by the closing of contacts 84 and 86 which are mounted in a normally opened position on an extension 41a for supporting finger 41 for the interlock or latch plate 39 (Figs. 1-4). The contacts 84 and 86 may be connected, in a well known manner, in the muting circuit of the radio set over biasing tubes in the amplifying circuit to give a cushioned effect so as to substantially eliminate any appreciable noise in the speaker. The mounting of the muting contacts 84 and 86 adjacent to the latch plate 39 provides for this muting effect whenever the plate 39 is pivoted by one of the armatures 21a–21f during switching from one tuning circuit to another. It is quite evident that the muting occurs only momentarily because the latch merely pivots from the full line position of Fig. 4, to the dotted line position and returns immediately.

Radio reception is turned off by pressing the "off" button, which closes the circuit for the release relay 26, the circuit from the transformer 71 being comprised of the conductor 78, the "off" button, conductor 87, interlocking switch 82, conductor 88, coil 21e and conductors 89 and 81. Energization of the coil 21e provides for an actuation of the armature 22e which acts only to raise the latch plate 39 to release armatures 22d and 22f from their closed positions. All of the contacts 56d and 62f are thus moved to their open positions and the armature 22e, upon release of the "off" push button is returned to its initial position by the action of its corresponding spring 38e. The radio set is thus entirely shut down on operation of the "off" push button. The later tuning in of a desired station is obtained by actuation of one of the control push buttons 1-4, in the manner above described.

Figure 5:
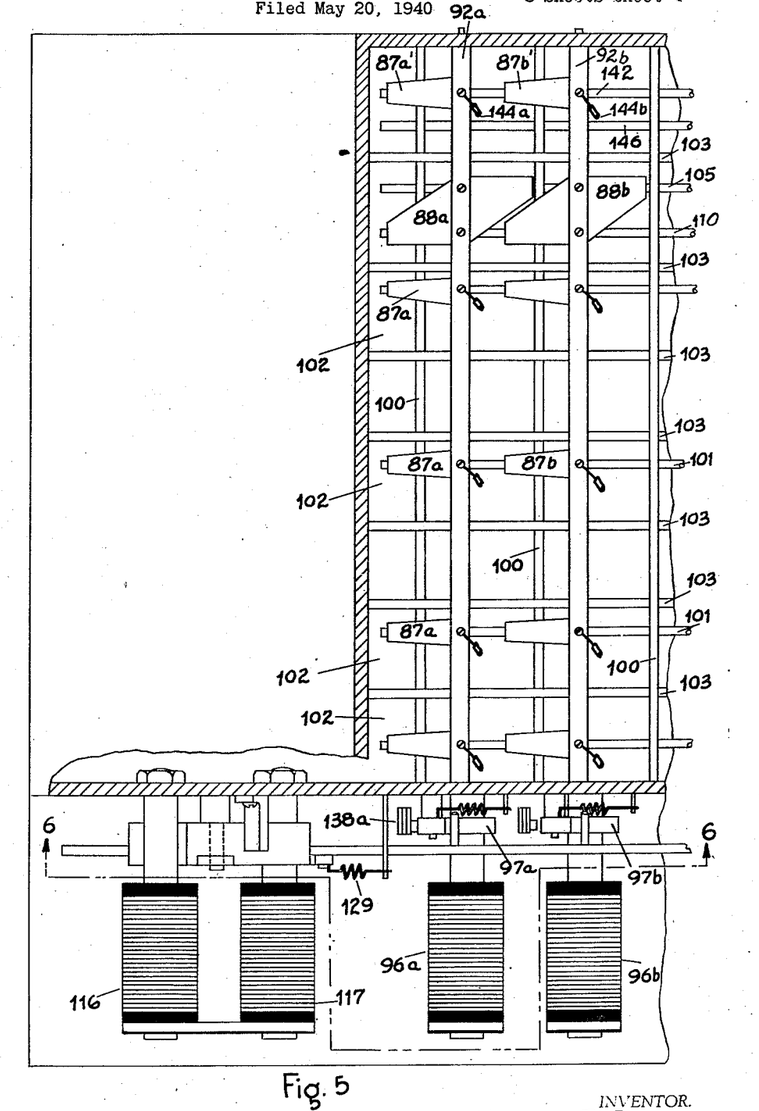
Fig. 5 is a fragmentary plan view of a modified form of the invention.
Figures 6, 8, 9, 10:
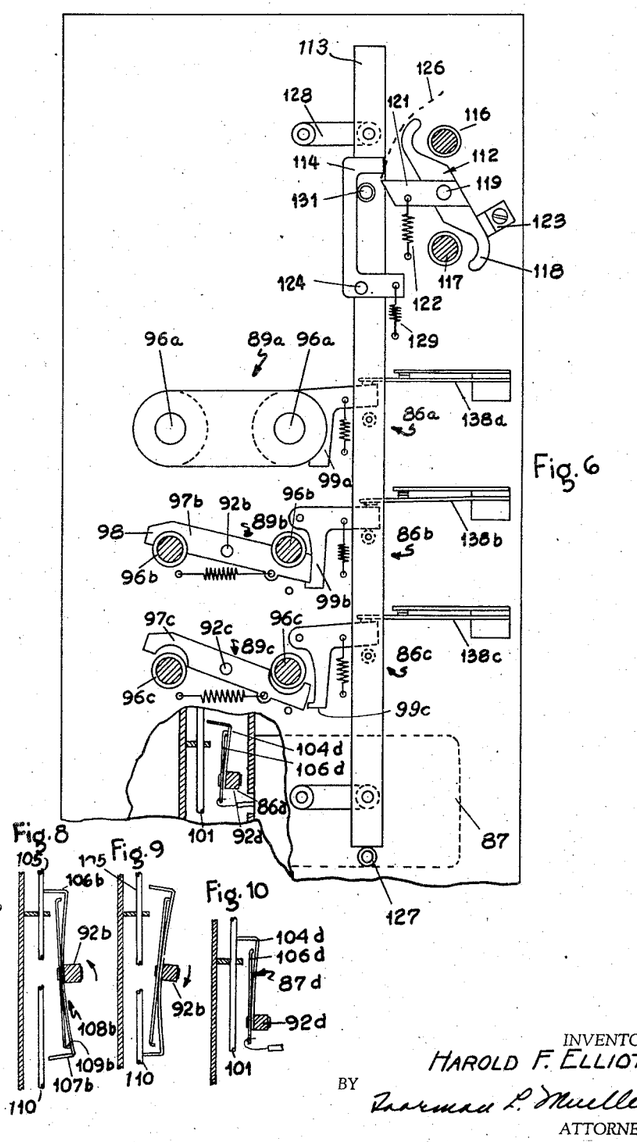
Fig. 6 is a fragmentary sectional view as seen along the line 6—6 of Fig. 5.
Figs. 7, 8 and 9 illustrate in detail, but in changed positions, a multiple contact switch of a type used in the embodiment of Fig. 5.
Fig. 10 illustrates in detail a single contact switch of a type utilized in the embodiment of Fig. 5.

Referring to Figs. 5 and 6 the tuner illustrated includes a plurality of tuning switches 86a-86d, each of which is comprised of a plurality of contact switches 87a-87d and 88a-88d, and a relay mechanism such as 89a-89d for operating the contact switches. A suitable base plate, electronic tubes, transformers, capacitors, inductors and the like are of course provided but will not be enumerated in detail here for the sake of simplicity. The arrangement of tubes, tuning apparatus, switches, and relays is such that each amplifier stage may be connected with any one of a plurality of circuit tuning elements by the action of the relays. The relays are in turn arranged so that the operation of any one relay brings into action a co-ordinated set of circuit elements specifically adapted to the purpose to which the relay is devoted, as for example an entertainment program via a wire line, or via radio, or a television program via short wave radio.

Figure 7:
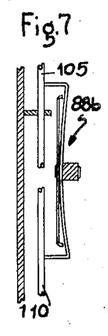

Each relay 89a-89d comprises an insulating rotary shaft 92a-92d which carries the rotary contact switches, 87a-87d and 88a-88d; the contact switches being operated by electromagnets such as are shown at 96a, 96b, and 96c and corresponding armatures such as 97a, 97b, and 97c, respectively. An armature is shown in open position at 97c and in closed position at 97b, being held closed by latch 99b. Each amplifier stage may be provided with one or more conductors or busses as 101, through which connections may be made to the tuning elements associated with that stage, via the switches; the busses being suitably supported on insulating bars 100. The busses and switches for each stage may be grouped in suitable shielded compartments as indicated at 102, the shields being shown at 103. The shaft of each relay, as 92a, may carry as many sets of contacts as required to perform the switching operations necessary to connect and tune the circuit associated with that relay. The contacts may be constructed in a great variety of ways depending upon the service to be performed, production methods, etc. The switches, busses and tuning elements are thus completely isolated when the switches are open, avoiding capacity effects and interactions between circuits. The switches 87a-87d may be used where a single break with nominal stray capacity coupling is satisfactory. Each switch such as 87d includes a flexible leaf contact 104d which is moved out of contacting engagement with a conductor such as 101 as shown in Figs. 6 and 10 by a relatively stiff actuating conductor member 106d, the contact 104d and conductor 106d being suitably attached to the shaft 92d. The member 106d is provided at its free end with a pig tail lead for completing the tuning circuit. When the contact is in the closed position shown in Fig. 10, the separation of the member 106d from the leaf spring contact 104d provides for the exertion of a definite pressure by the spring on the bus 101 to effect an efficient contacting engagement. A switch such as 88b provides for momentary connections between busses 105 and 110 in the "fader" circuit discussed further below; the switch being shown in detail in the changed positions illustrated in Figs. 7, 8 and 9. The switch contacts 106b and 107b for connection with the conductors 105 and 110, respectively, are provided at the ends of a substantially U-shaped spring contact member 108b which is adapted for movement by an actuator member 109b, the actuator and spring member being suitably secured to the rotary shaft 92b. The spring contacts 106b and 107b effect a momentary cross-connection between bars 105 and 110, as shown in Fig. 7, whenever any relay is either opened or closed, thus providing momentary muting during relay operation.

The relay arrangement includes a mechanical interlocking system which provides for holding the relays closed after they have been set by electrical impulses of short duration. When the operating coils of any relay are energized the switches attached to that relay are closed and locked and all other relays are opened automatically. This is arranged by providing each relay with a latch, as illustrated at 99b for relay 89b which is shown closed, and at 99c for relay 89c which is shown open. Release relay 112 is mechanically connected with the latches of all relays through release bar 113. A trip or release mechanism 114 interconnects release relay 112 and release bar 113 in such a way that an impulse to relay 112 moves the bar 113 upward thereby tripping all relay latches and then immediately permits bar 113 to return to its original position. The release relay 112 comprises two electromagnets 116 and 117 and an armature 118 which is pivoted to rotate on pin 119. A trip arm 121 is attached to the armature and rotates with it about pin 119 as an axis. Spring 122 holds the rotating elements in the position illustrated against the stop 123 when the magnets are not energized. When current is applied to electromagnets 116 and 117 armature 118 rotates clockwise, carrying with it trip arm 121. The outer end of the trip arm 121 engages with latch 114 which is attached to the bar 113 through the pivot 124. Bar 113 is pulled upward as viewed in Fig. 6, by the rotation of the trip arm 121 about the pivot 119. The outer end of the trip arm 121 swings in an arc about the pivot 119 as shown by the dotted line 126. Due to this curvature, after a few degrees of rotation, the outer tip of arm 121 slides from the outer tip of latch 114 to disengage the two members. Spring 129 then pulls bar 113 downward against the stop 127. Bar 113 may slide in grooves or may be suspended on rotatable arms as 128. When the magnets 116 and 117 are de-energized, spring 122 pulls trip arm 121 back to the position illustrated in Fig. 6. Latch arm 114 which is pivoted to bar 113 at 124 is pushed out of the way by the tip of arm 121 as it passes. After this the spring 129 pulls the latch 114 back against the stop 131 and trip arm 121 and the latch 114 are in position for another cycle of operation. This permits any main relay, simultaneously or thereafter energized, to be latched shut as shown accomplished with respect to latch 99b. Any relay not energized will be left open, as is the case with respect to relay 89c. It is thus possible to set any relay, and release any previously set relay by a single impulse of short duration. To this end, the operating coils of the release relay 112 may be connected in a return circuit common to the operating coils of all relays. Release relay 112 then operates whenever any of the setting relays are actuated. All relays may be opened by routing an impulse through the coils of release relay 112 separately.

The circuit tuning elements associated with each tuning switch 87a—87d, and 88a—88d may be of any type suitable to the function to be performed. In some instances each tube may have a single tuning inductor and a plurality of adjustable tuning capacitors which may be connected successively to the inductor by the relays for tuning in various channels or stations. In other instances a plurality of tunable circuits, each complete in itself, may be provided. The circuits may be arranged singly or in coupled pairs with or without band pass characteristics. If circuits in coupled pairs are used the coupling and damping may, if desired, be adjustable so that the response characteristics may be adjusted to the specific conditions of operation of that channel. Band pass action may be obtained in any set of circuits by staggering the tuning of the element comprising the amplifier stages thereof, introducing damping if required by use of either fixed or variable resistors, either in series or in shunt with tuning elements.

Figure 18:
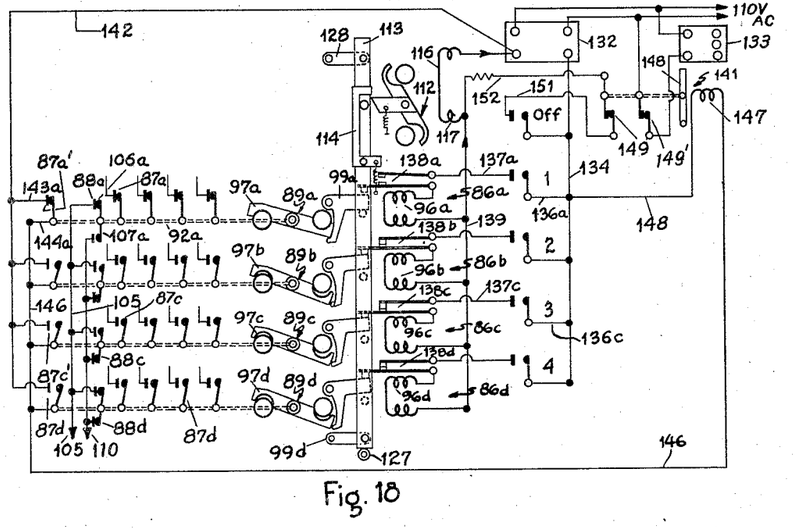
Fig. 18 is a diagrammatic illustration of the electrical circuit for the embodiment of Fig. 5 and its associated switches.

The operating circuit for the tuning apparatus in Figs. 5 and 6 is illustrated in Fig. 18, the control impulses for operating the various relays being of short duration; the control current source being indicated at 132 as comprising a rectifier and/or transformer with the power supply for the radio set (not shown) being indicated at 133. The tuning switches 86a—86d are shown as being operated manually by push buttons 1-4, inclusive, respectively, although it is to be understood that the switches may be readily adapted for operation by remote control or suitable clock mechanism. In the operation of the circuit let it be supposed that the station identified by push button 1 is to be tuned in. Operation of the push button momentarily closes the control circuit from the rectifier 132 through conductors 134 and 136a, push button 1, conductor 137a, contacts 138a, coils 96a, conductor 139, and coils 116 and 117 back to the rectifier. Energization of the coils 116 and 117 actuates the release relay 112, in the manner fully described above, to effect an opening of all previously closed tuning switches, by releasing the previously closed relay mechanisms. On energization of the coils or magnets 96a, the latch 99a is moved into its closed position with the armature 97a, the movement of the armature 97a acting to rotate the shaft 92a to effect a closing of the associated circuit switches 87a and 87a' and an operation of the switch 88a. Closing of the switch 87a' closes the circuit of the power relay 141 across conductors 142 and 143a, switch 87a', conductors 144a and 146, power relay coil 147 and back to the rectifier through conductors 148 and 134. Energization of the coil 147 operates armature 148 to close the interlock contacts 149 and the power supply contacts 149', whereby current is supplied to the power source 133 for the radio set, (not shown). The interlock contacts 149 operate to open the circuit of the "off" bus as will be explained. This refinement prevents the release relay 112 from "clicking" in the event "off" impulses are passed when the set has already been turned off, as in cases where the buttons 1-4 are actuated by a clock mechanism. A further refinement which may be desirable in some cases comprises the interlock contacts 138a—138d which are introduced in series with the relay closing coils 96a—96d, respectively. These contacts are preferably arranged to open after the associated relay has been latched closed, thereby opening the operating circuit of that relay. This refinement prevents the relay drawing current or "clicking" after it has been closed. The tuning of the particular circuit is thus substantially concurrently obtained with the turning on of the radio set by actuation of the push button 1, the coils 116 and 117 acting only to operate the release relay 112 and the coils 96a the tuning switch 86a.

With the tuner thus conditioned by button 1, it is now desired to tune in the station controlled by button 3, which operates tuning switch 86c. Actuation of push button 3 closes the circuit for the release relay 112, and the relay mechanism 89c through conductor 134, and 136c, push button 3, conductor 137c, interlock contacts 138c, coils 96c and conductor 139 to release relay coils 116 and 117, and the rectifier 132. The release relay 112 operates to release the latch 99a from engagement with the armature 97a whereby to open all of the switches 87a, 87a', and 88a and hence the tuning circuit controlled by push button 1. Energization of the coils 96c conditions the switches 87c and 87c' for a tuning in of the new station in a manner similar to that previously described in connection with the operation of push button 1.

In order to cushion surges in the amplifier and speakers when a shift of stations is made, a set of interlock contacts, as indicated at 88a–88d is provided. These contacts cause a momentary cross connection to be made between busses 105 and 110 for momentarily muting the output of the receiver in any desired manner. For example the gain of the radio frequency amplifying and volume control stages may be momentarily reduced, causing one station to "fade" out and the other to "fade" in.

In the event it is desired to turn the radio receiver off the "off" button is operated. This operation of the "off" button closes the circuit from the rectifier 132 through conductor 134, the "off" button, conductor 151, contact 149, conductor 152 and coils 116 and 117 back to the rectifier. Energization of the coils 116 and 117 operates the release relay 112 to release the latch 99a whereby to open the tuning switch 86c, opening of contact 87c' effecting a de-energization of coil 147 and a consequent opening of the contact 149', to shut off the supply current to the power source 133 for the radio set. The release relay 112 is thus seen to be operated to open previously latched relays 99a—99d whenever a shift is made from one station to another and also whenever the "off" signal is given.

Figure 15:
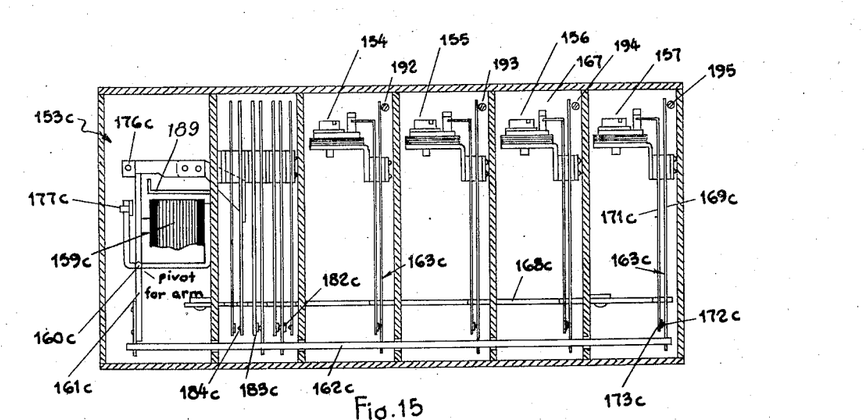
Fig. 15 is a sectional view taken approximately along the line 15—15 in Fig. 12.
Figure 16:
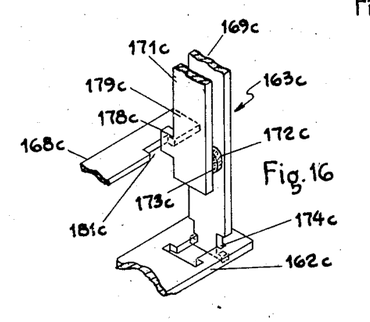
Fig. 16 is a detailed showing of a tuning switch used in the embodiment of Fig. 11.

A further modification of the invention is shown in Figs. 11–16, inclusive. Numerals 153a–152d indicate four of a plurality of tuning switches which are used for making the connections necessary to tune the receiver for various channels or stations. Four banks of adjustable tuning capacitors are indicated at 154 to 157 inclusive. Since all of the tuning switches such as 153a–153d are of similar construction only, switch 153c will be referred to in the following description. Each tuning switch as 153c comprises an electromagnet, as shown at 159c, Fig. 15, and an armature, 161c, which serve to operate a plurality of contacts through the medium of an insulating tie bar 162c. This figure is a section along line 15—15 of Fig. 12 taken so as to show in elevation the operating mechanism and contacts of relay 153c, which is shown here in closed position. Four sets of contacts, 163c, are provided for connecting into tuned circuits the tuning capacitors as 154, 155, 156 and 157, associated with the channel or station assigned to this particular relay. The transformers of the amplifier stages whose circuits are thus tuned may be housed in suitable shields as indicated at 164, Fig. 11, and a bank of amplifier tubes may be placed adjacent thereto as indicated at 166. The switches and capacitors associated with each stage may be housed in a shielded compartment as indicated at 167, Figs. 11 and 15. Stationary insulating bars 168a, Fig. 11, and 168c, Fig. 15, may be provided for holding the "stationary" contacts in the required positions, cooperating with the insulated tie rods, as 162a and 162c, which serve for actuating the "moving" contacts of the several switches. Further details of these contacts, rods, and bars are shown in Fig. 16 representing a perspective view of contacts 163c and associated tie rod 162c and bar 168c.

Each switch, as 163c, comprises two spring leaves as 169c and 171c which carry contacts as 172c and 173c. Spring leaf 169c is dovetailed into the insulating tie rod 162c as illustrated at 174c. Spring leaf 169c therefore moves with rod 162c whenever the latter is actuated by armature 161c (Fig. 15). Armature 161c is pivoted at 160c. Energization of the electromagnet 159c attracts armature 161c to the magnet and shifts the bar 162c to the left as shown in Fig. 15. This moves all of the switch leaves 169c which are dovetailed to the bar 162c to the left and closes all of the associated contacts as 172c and 173c thereby connecting into the circuit the tuning elements controlled by these switches. Latch 176c engages the armature 161c and holds the switches closed after the magnet is de-energized. When the latch 176c is tripped, as described hereinafter, the spring leaves 169c of the switches pull tie bar 162c to the right until the armature 161c rests against the stop 177c. In order that this motion may open the contacts as 172c and 173c, spring leaf 171c is provided with a projection 178c which engages with a fixed stop 179c. This stop is formed by a notch 181c in the stationary insulating bar 168c (Fig. 16). Leaf 171c is free to move to the left when leaf 169c moves to the left for bringing contacts 172c and 173c into closed position. When leaf 169c moves to the right, the motion of leaf 171c is limited by the projection 178c engaging the stop 179c. The notch 181c thus positions leaf 171c so that motion of the tie bar 162c may open and close contacts 172c and 173c. The pressure applied to the contacts is determined by the tension of the spring leaf 171c and this pressure is applied to the contacts the moment they are closed, being approximately the same as the pressure exerted by spring leaf 171c against stop 179c. The notched bar 168c therefore serves to determine the position of its associated spring leaves as 171c, and the construction permits definite contact pressures to be maintained as well as definite positions. The construction also permits the moving switch elements as spring leaf 169c to serve as the spring for actuating armature 161c pulling it away from the magnet 159c when de-energized. The dovetail and notch construction of insulating bars 162c and 168c permits the use of low cost stampings and this construction likewise facilitates the assembly of the multiple switch parts.

Figure 11:
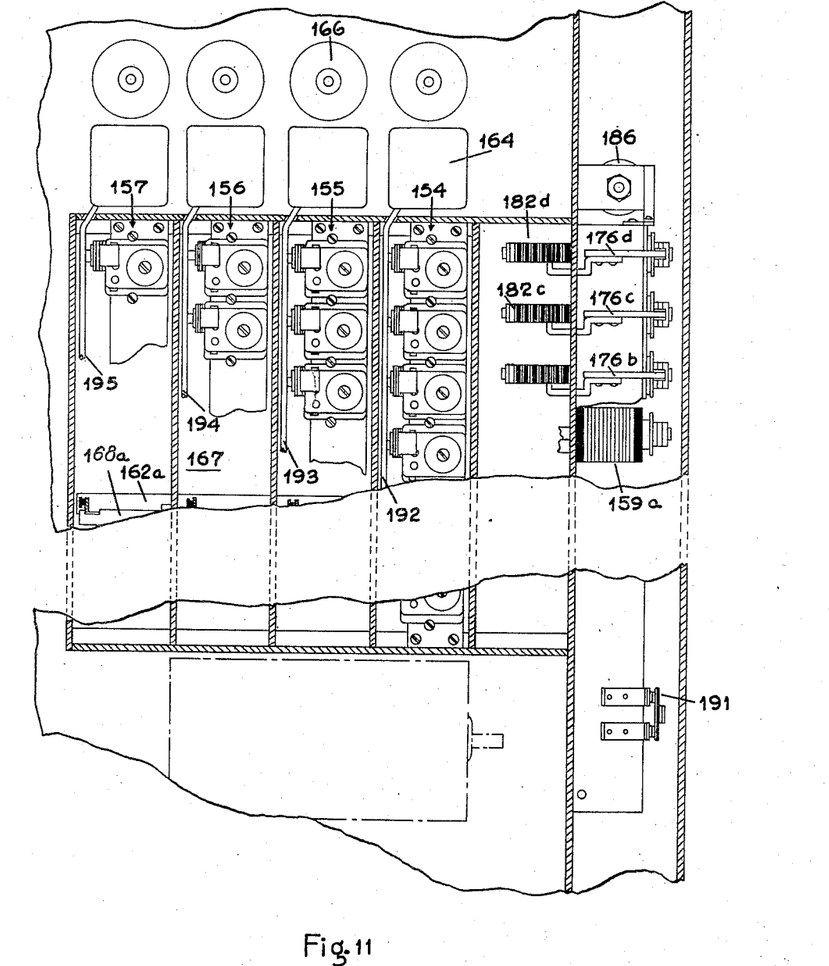
Fig. 11 is a fragmentary plan view, with parts thereof in section, illustrating yet another form of the invention.

In addition to the switches for performing tuning operations, each relay may carry as many auxiliary switches as needed. In Figs. 11 and 15, a three element auxiliary switch 182c is provided for operating the biasing circuits which provide for "fading" to give quiet operation during the shift from one station to another as discussed in connection with switches 88a–88d, Fig. 18. A second auxiliary switch 183c serves to energize the power supply contactors, as shown at 149 and 149' in Fig. 18. A third set of auxiliary contacts indicated at 184c may be arranged to function in cooperation with the latch 176c, Fig. 11, providing means for opening the control circuit of the tuning switch 153c after it is latched closed, as indicated at 138a–138d, Fig. 18, when such an arrangement is considered desirable. Other arrangements of contacts for other purposes may, of course, be provided as required. It will be evident that the construction shown provides great flexibility in the switching arrangements which may be carried out. A great variety of contact opening and closing arrangements, with or without intervening shielding may be assembled along the lines indicated.

Figures 12, 14:
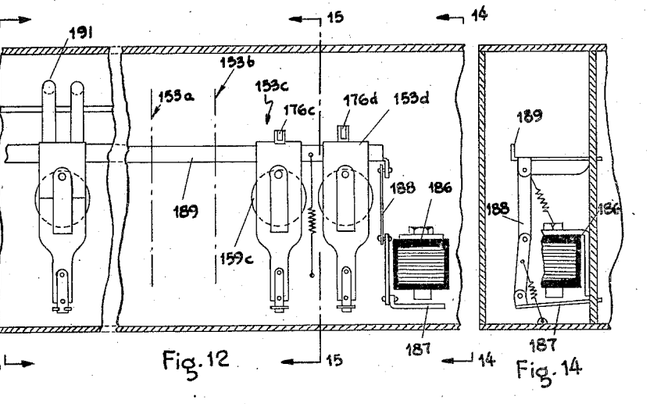
Fig. 12 is a fragmentary front elevation showing the arrangement of the power relay and tuning switches in the embodiment of Fig. 11.
Fig. 14 is a sectional view taken along the line 14—14 of Fig. 12.

Relays which are to be held closed after receiving a closing impulse may be provided with latches as illustrated at 176a-176d, Figs. 11, 12, and 15. Figs. 12 and 14 show also the release mechanism comprising electromagnet 186, armature 187, and linkage 188 interconnecting the armature 187 and trip bar 189. Linkage 188 may take a variety of forms. As shown in Fig. 14 it comprises a link and bell crank so arranged that bar 189 is momentarily lifted to trip the latches whenever the trip coil 186 is energized. Bar 189 is then allowed to drop again even though the relay is still energized. This permits any relay receiving an impulse to be closed and latched while previously closed relays are released.

Figure 13:
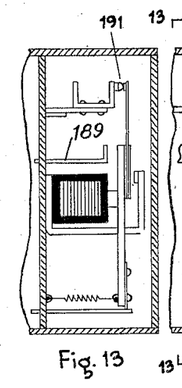
Fig. 13 is a sectional view as seen along the line 13—13 of Fig. 12.

Figs. 12 and 13 indicate arrangements whereby contacts as 191, for handling power circuits may be applied to the relays. Such power contacts may be used also with any of the tuning relays to close the power circuit in place of using a separate contactor therefor. This construction may be used also to make a power circuit contactor from standard relay parts. Such a contactor may be provided with interlock contacts similar to contacts 183c, and a latch similar to 176c if desired. An electrical interlocking and latching system may be used in place of the mechanical latches illustrated by 176c and release bar 189 if desired.

Busses, as 192-195, inclusive, may be provided for interconnecting the various interrelated switches and tuning elements.

The invention is thus seen to provide for a compact, efficient, and low-cost tuning apparatus in which a continuous bus or conductor serves as a common connector and contact in all of the tuning circuits. There is also provided interlocking means which is adapted to hold closed the last actuated contacts and to release all previously closed contacts; with the circuit closing magnet operating and latching means. The magnets for operating the tuning circuits and the power and release relays are of similar construction and readily adapted for use in either A. C. or D. C. circuits. All of the contacting switch elements are adapted to provide for a definite contacting pressure in their closed positions to effect a positive and efficient closing of all of the tuning circuits. Although the invention has been described and illustrated with reference to push-button control, it is to be understood that it is equally adaptable for operation by remote control or by a clock mechanism.

It is to be understood also that only preferred embodiments of the invention have been illustrated and described herein and that modifications thereof can be made which are within the full intended scope of the invention as defined by the appended claims.

I claim:

1. Electrical apparatus including a plurality of relays, means for selectively closing said plurality of relays, latch means for releasably holding a selected relay in closed position, means acting on said holding means to release said held relay simultaneously with the energizing of a selected relay, and means for immediately restoring said holding means to a condition for holding the other selected relay in a closed position.

2. Electrical apparatus including a plurality of relay units, means for selectively closing a relay unit, mechanical means operatively associated with said relay units and adapted for holding a selected relay in closed position, means for releasing a held relay simultaneously with the energization of a selected relay unit, means for restoring the holding means to provide a holding position with the energized relay unit to hold the same in an operated position, and tension means for returning said released relay to an open position.

3. Electrical apparatus including a plurality of relay units, tension means for retaining said relay unit in an open position, means for selectively closing a relay unit against the pressure of said tension means, each of said relay units including an armature, and means for releasably locking said armature in an operated position, said locking means being actuated simultaneously with the energization of a selected relay unit to effect a momentary release of said held armature and to immediately lock in operated position the armature of said selected relay, with said tension means returning the relay corresponding to said released armature to an open position.

4. Electrical apparatus including a plurality of relays, means for selectively closing said plurality of relays, means for releasably holding a selected relay in closed position, a trip mechanism operatively common to all of said relays for actuating said holding means to release a held relay, means for energizing said trip mechanism simultaneously with the energizing of a selected relay to release any held relay, means for immediately restoring the holding means to a holding condition to hold the selected relay in a closed position, and means for returning said released relay to an open position.

5. Electrical apparatus including a plurality of relay units, means for selectively closing a relay unit, mechanical means for each relay unit for holding a selected relay in closed position, a single trip mechanism common to all said holding means and mechanically connected therewith, means for energizing the trip mechanism simultaneously with the energization of a selected relay unit, and means acting on said trip mechanism to cause it to momentarily release an operated holding means with all of said holding means being immediately restored to a position at which a holding means corresponding to a selected relay unit acts to hold the same in operated position.

6. Electrical apparatus including a plurality of relay units, a single trip relay unit electrically common to all of said relay units, movably mounted mechanical means operatively connected with said single trip relay unit and mechanically common to all of said plurality of relays, holding means operatively connected with said movably mounted mechanical means and acting on each relay individually, means for selectively energizing said relay units and substantially simultaneously with the energization of a selected relay unit energizing said single trip relay unit to cause momentary actuation of said mechanical means to release any held relay units, and means for substantially immediately thereafter restoring said mechanical means to a position at which said selected relay unit may be held in operated position by said holding means.

7. Electrical apparatus including a plurality of relays, each of said relays including an electromagnet and an armature, means for selectively operating said armatures, latching means for each armature for mechanically latching a selected armature in operated position, a single unlatching means mechanically common to all said latching means, a single relay for operating said single unlatching means, and circuit means for substantially simultaneously energizing a selected relay and said single relay for operating said single relay to unlatch any latched armatures on the relays, and with said unlatching means being immediately returnable to idle position to permit the latching means for a selected relay armature to latch such armature all during merely a momentary energization of a selected relay.

8. Electrical apparatus including a plurality of relay units, with each of said relay units including an electro-magnetic unit having an armature, means for selectively operating said armatures, interlock means for mechanically locking a selected armature in closed position, and a single trip means operatively common to all of said relay units acting on said interlock means for opening said closed armature concurrently with the operation of another selected relay.

9. Electrical apparatus including a plurality of selectively operated relays, each of said relays including a rotatable shaft, electric switch means supported on said shaft, an armature secured on said shaft, an electromagnet having the poles therefor positioned with reference to said armature in such a manner as to accomplish rotary movement of said armature upon energization of said electromagnet, a plurality of latching elements, with one of said latching elements for each of said armatures to latch a selected armature in operated position, means for unlatching a latched armature including a movable member common to all of said latching elements, and means for moving said movable member upon energization of any one of said relay electromagnets to simultaneously move all of said latching elements to unlatch any armatures latched, with said member being restored substantially immediately to a position at which the armature for a selected energized relay may be latched in operated position.

10. Electrical apparatus including a plurality of selectively operated relays, each of said relays including a movable armature, a pivoted latch common to said relay units for latching a selected armature in an operated position, and means for unlatching a selected latched armature before the closing of a later selected relay, said means including the armature for the later selected relay, said armature in the later selected relay acting to move said pivoted latch to unlatch said latched armature prior to moving into a latching position.

11. A pre-assembled control unit for an electrical system including a plurality of selectively energized relay units, a power relay common to all of said relay units, means common to said power relay and relay units for holding said relay and relay units in an operated position, with said power relay being energized simultaneously with each of said relay units, and a trip relay operable to move said holding means out of holding position with said relay units and power relay.

12. Electrical apparatus including a plurality of relay units, each of said units including a movable armature, and a pivoted latch for each of said relay units for latching engagement with its associated armature, means common to all of said latches for moving the same, said means including a slidable elongated member having a plurality of projections with a projection corresponding to each of said latches for engaging said latches upon movement of said member in one direction, a trip on said member, a trip relay having movable means for engagement with said trip to move said member in said one direction to a position at which said movable means becomes disengaged from said trip, and means for moving said member in a direction opposite to said one direction to an idle position.

13. In electrical apparatus as defined in claim 12, with said trip relay comprising an electromagnet having a pair of spaced apart pole pieces, an armature pivoted intermediate said pole pieces for pivotal movement into engagement with both pole pieces upon the energizing thereof, with said armature carrying said movable means for engagement with said trip.

14. Electrical apparatus including a plurality of relay units, each of said units including a plurality of switches, a single movable member common to all of said switches and acting to close the same, means for moving said member, including an armature pivoted intermediate its ends and connected at one end to said member, an electromagnet acting on the other end of said armature to attract the same thereto, and pivoted latch means for engaging said armature and holding it in engagement with said electromagnet.

15. Electrical apparatus including a plurality of relay units, each of said units including a plurality of switches, with each of said switches having a pair of spring contact members, a movable member connected to one spring contact in each of said pairs, an armature pivoted intermediate its ends for moving said member, an electromagnet on one side of the armature pivot point for attracting said armature thereto upon energization of such electromagnet to move said member in one direction and with the connected spring contacts acting to move said member in the other direction upon the de-energization of said electromagnet, and stationary insulating means having a stop portion corresponding to each of said pairs of switch contacts for limiting the movement of the other switch contact in each of said pairs when said member is moved in such other direction.

16. Electrical apparatus including a plurality of relay units, each of said units including a frame, a stationary electromagnet mounted thereon, a pivoted armature mounted on said frame adapted to be attracted to said electromagnet, a plurality of switches for each of said relay units, each of said switches being independently mounted upon said frame and including a pair of switch contacts, a movable member connected with said armature and movable therewith and being operatively connected with one of the switch contacts for each of said plurality of switches, a stationary stop bar mounted on said frame having a stop portion corresponding to each of said switches, with the other of said contacts for each switch adapted to engage a corresponding stop portion on said bar upon movement of said member in one direction to separate said contacts and open an electrical circuit through each switch, with said contacts in each switch adapted to be closed upon movement of said member by said armature in the opposite direction.

17. A preassembled control unit for an electrical system including a plurality of selectively energized relays, a power relay, each of said relays and power relay including a movable armature in operative association with a plurality of control switches, with said power relay being energized simultaneously with the energization of a selected relay, latching means for lockingly engaging said armatures to provide for a holding of said power relay and said selectively energized relay in a closed position, each of said armatures on energization of its corresponding relay acting to move said latching means to open all previously closed relays before effecting a locked engagement with said latching means.

18. A pre-assembled control unit for an electrical system as defined in claim 17, having a trip relay including a movable armature, said trip relay being adapted for energization independently of said relays and power relay, energization of said trip relay effecting a movement of its associated armature to trip said latching means to open said previously closed selected relay and said power relay, with said trip relay remaining open after said tripping operation.

19. Electrical apparatus including a plurality of relay units and a conductor common to all of said units, each of said units including a movable armature and a control switch in operative association with said armature, latching means for lockingly engaging said armature to provide for a holding of its associated relay unit in an operated position, said control switch including a spring contact arm normally tensioned to effect contact with said conductor, an insulating member arranged between said contact arm and armature, the spring tension in said arm being adapted to effect a following engagement of said member with said armature, said armature in an unlatched open position co-acting with said member to hold said contact arm out of engagement with said conductor, and said member on latching engagement of said armature in a closed position being floatingly supported between said contact arm and armature to provide for the exertion of a definite spring pressure on said conductor by said contact arm.

20. Electrical apparatus including a plurality of relay units, each of said units including an armature and a plurality of switches, a single movable member common to said switches and acting to close the same, means for moving said member including said armature, said armature being pivoted intermediate its ends and in operative engagement with said member, an electromagnet acting at one end of said armature to attract the same thereto, and pivoted latch means for engaging said armature and holding it in engagement with said electromagnet.

21. Electrical apparatus including a plurality of relay units, each of said units including a magnet and an armature, said armature having a slotted aperture formed near one end thereof, supporting means for said magnet having a projecting portion thereon substantially co-extensive in length with said magnet, said projection being provided with a plurality of extending fingers corresponding in number to said relay units, the finger for each relay unit being adapted to fit within said armature slot to provide for a pivotal support of said armature adjacent said projection, said projection on energization of said magnet providing for a flush engagement of said magnet and armature, and a control switch arranged for operation in response to movement of said armature, with energization of said magnet moving said armature to provide for a closing of said switch.

22. Electrical apparatus including a plurality of relay units and including a supporting frame of substantially L-shape for a plurality of operating magnets for said units, with said magnets being arranged in longitudinal alignment on said frame, and one of said frame leg members being substantially co-extensive in length with said magnets, a plurality of armatures corresponding to said magnets pivotally supported adjacent the end of said one leg member, a longitudinally extending conductor common to all of said relays, a longitudinally extending insulating member common to all of said relay units, each of said armatures being movable between said insulating member and its corresponding magnet, latching means common to all of said relay units adapted for locking engagement with said armatures to provide for a holding of said relay units in an operated position, said latching means being pivotally connected to said supporting frame, with each armature being operable to move said latching means to effect an opening of all previously closed relay units prior to effecting a locking engagement with said latching means, a control switch for each of said relay units including a spring contact arm normally tensioned to effect a contacting engagement with said conductor, said control switches being arranged in longitudinal alignment, and the control switch, armature and magnet of each relay unit being in transverse alignment, and a flat insulating member arranged between said armature and spring contact arm, the latched engagement of said armature providing for a floating support of said member between said armature and contact arm to provide for a positive spring pressed engagement of said contact arm with said common conductor.

23. Electrical apparatus including a plurality of relays, means for selectively closing said plurality of relays, means common to said plurality of relays for releasably holding a selected relay in closed position, means acting on said holding means to release said held relay simultaneously with the energizing of another selected relay, means for immediately restoring said holding means to a holding condition to hold said other selected relay in a closed position, and means for returning said released relay to an open position.

24. Electrical apparatus including a plurality of relays, means for selectively closing a relay unit, latching means common to all of said relay units, a portion on each of said relays movable therewith into locking engagement with said latching means to hold a selected relay in a closed position, with the portion of said selected relay acting on said latching means to release a previously held relay simultaneously with the energizing of said selected relay, means for restoring said latching means to a position for locking with the portion on said selected relay, and means for returning said released relay to an open position.

HAROLD F. ELLIOTT.